UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

METHOD OF PREPARING PASTE.

1,416,787.     Specification of Letters Patent.     Patented May 23, 1922.

No Drawing.     Application filed April 19, 1920. Serial No. 374,870.

*To all whom it may concern:*

Be it known that I, CAMPBELL C. CARPENTER, a citizen of the United States, residing at Niagara Falls, in the county of Niagara and State of New York, have invented new and useful Improvements in Methods of Preparing Paste, of which the following is a specification.

The present invention relates to methods of preparing paste.

More particularly the present invention relates to methods of preparing paste used in storage battery plates. It has been a difficult matter to obtain commercially lead compounds which have sufficient uniformity to be directly applied to storage battery plates.

An object of the present invention is to provide a method of preparing active material for storage battery plates, in the practice of which the constituent parts of said active material may be readily controlled.

A further object is to provide a method for producing active material for storage battery plates which may be used for both positive and negative plates.

Further objects will appear as the description proceeds.

According to the present invention, metallic lead is treated, preferably in an electrolytic bath, to convert said lead into sponge lead. After having been thoroughly washed to remove all impurities, said sponge lead is ground to a definite fineness. During said grinding process or thereafter, said sponge lead is treated with a solution of sulphuric acid, producing a mixture of sponge lead and lead sulphate. Said mixture may be dried and applied to a grid direct; or this dry material may be treated with water, or other liquid, and applied to the grid in a wet state; or, if preferred, after the treatment with sulphuric acid as above recited, the resulting product may be applied in the wet state directly to the grid.

The treatment of the lead in the sponge state with the acid may be readily controlled, whereby to obtain the proper proportions of sponge lead and lead sulphate. This process may be used for preparing paste for both positive and negative plates. In a storage battery, under the influence of electric current, said paste in a negative plate will be converted in part to sponge lead. In the opposite plate it will be converted in part to lead peroxide.

Many modifications of the present invention will occur to those skilled in the art. It is intended in this patent to cover all such modifications that come within the scope of the invention as defined by the appended claim.

What I claim as new and desire to secure by Letters Patent of the United States, is—

The method of preparing paste which consists in providing sponge lead, grinding same to a definite fineness and treating same with sulphuric acid, controlling the ratio of sulphuric acid and sponge lead, whereby to control the proportions of sponge lead and lead sulphate in the resulting product.

In witness whereof, I have hereunto subscribed my name.

CAMPBELL C. CARPENTER.